United States Patent

[11] 3,602,834

[72] Inventor Gerald K. McAuliffe
Mahopac, N.Y.
[21] Appl. No. 47,464
[22] Filed June 18, 1970
[45] Patented Aug. 31, 1971
[73] Assignee International Business Machines Corporation
Armonk, N.Y.

[54] TIMING RECOVERY CIRCUITS

14 Claims, 6 Drawing Figs.

[52] U.S. Cl. .......... 331/1 A, 331/14, 307/269
[51] Int. Cl. .......... H03b 3/04
[50] Field of Search .......... 331/1 A, 14; 307/269

[56] References Cited

UNITED STATES PATENTS 3,479,598 11/1969 Weller .......... 331/1 A

*Primary Examiner*—John Kominski
*Attorneys*—Hanifin and Jancin and T. J. Kilgannon, Jr.

ABSTRACT: A timing recovery circuit based on the departure from the zero crossing of an analog signal is disclosed. The departure from the zero crossing is proportional to the amplitude of a sample taken at a time when an analog signal is expected to experience a zero crossing. The amplitude and polarity of the resulting signal are stored in a hold circuit which applies the signal to a means for determining the direction of a possible transition. In the meantime, the input signal is applied to a data decision circuit which may be a clocked flip-flop, for example, which samples the polarity of the analog signal half a bit time later than the first sampling of the analog signal. The resulting output (a "1" or a "0") is simultaneously applied to the means for determining the direction of a possible transition and to a means for determining if a transition has in fact occurred. The former is an inverting gate which, in response to the polarity of the output of the clocked flip-flop, provides at its output either the output of the sample and hold circuit or an inverted version thereof. The latter means consists of a delay device such as a one bit shift register to provide an output delayed by one bit and an exclusive OR gate, the terminals of which are connected to the input and output of the delay device. The OR gate provides an output only when the polarities of the samples at the input and output of the delay device are different. This circuit, in effect, makes a comparison between the polarity of a present bit and a previous bit to determine whether or not a transition has occurred. The output of the exclusive OR circuit and the inverting gate are applied to another gate. This gate is operative only if the exclusive OR provides an output indicating that a transition has occurred and the output of the inverting gate is applied to an averaging filter which provides a control signal for adjusting the frequency of a variable frequency oscillator; the zero crossing of which is to be synchronized with the zero crossings of the analog signal.

Figure 1:
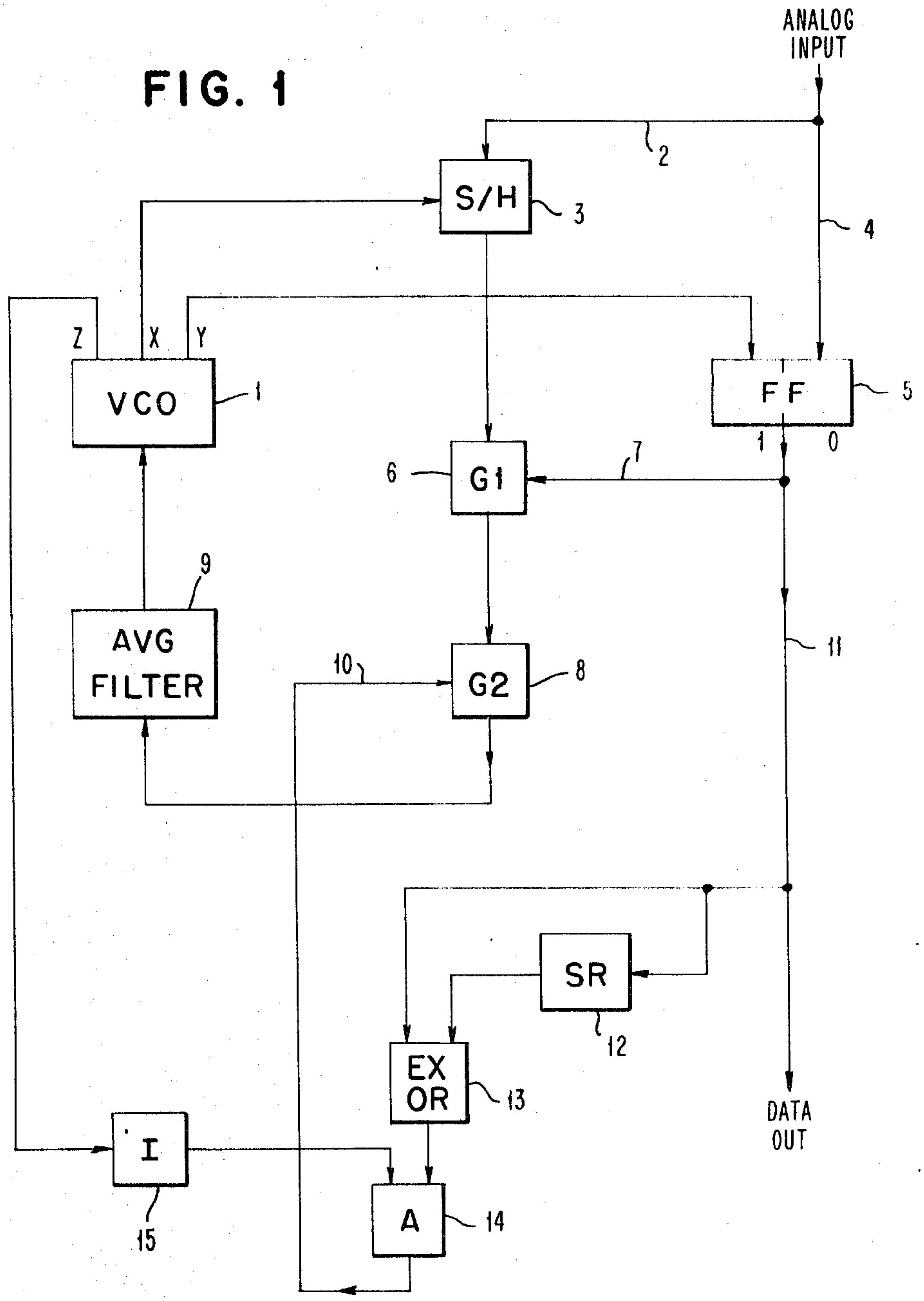

INVENTOR
GERALD K. Mc AULIFFE

BY Thomas J. Kilgannon Jr.
ATTORNEY

TIMING RECOVERY CIRCUITS

BACKGROUND OF THE INVENTION

1. Field of the Invention

This invention relates generally to timing or synchronization recovery systems wherein bit timing is obtained from the data signals. More specifically, it relates to proportional control arrangements wherein the value of some parameter which is representative of the departure from a zero crossing is utilized to generate a control signal. Still more specifically, it relates to a circuit wherein the amplitude and polarity of an analog signal at a first sampling time are utilized in conjunction with the polarity of the analog signal at a second sampling interval to detect the direction of a possible transition and to determine whether or not a transition has actually occurred. The results of these determinations, when combined, provide an unambiguous control voltage which, when applied to the control electrode of a voltage-controlled oscillator, drive it in such a way that the zero crossings of the analog signal and the output of the voltage-controlled oscillator are synchronous. The resulting timing recovery circuit, because it derives an analog control voltage by logic, rather than by comparisons between precisely timed pulses, is simple, and inexpensive and should find wide use in low-cost modems.

2. Description of the Prior Art

All communication systems which transmit information in digital form are subject to precise timing requirements if the information transmitted is to be recovered. Some communication systems transmit timing independently of the data or utilize separate timing pulses to synchronize the timing of the receiver with the timing of the incoming data. Other systems recover their timing from the transmitted data itself. Most of the known timing recovery circuits base timing on the zero crossings of the data using an early-late gate. In such systems, the number of zero crossings which occur earlier than those of the local data clock is compared with those which occur later. The former are made to generate one polarity of pulses while the latter generate another polarity of pulses. These pulses are then averaged in a countdown arrangement and provide the desired synchronized output. This technique may be implemented digitally or in an analog fashion.

The above-described technique is very precise but rather complex circuitry is involved. Gate pulses for the early and late gates must be generated and these must be narrower than the data period.

Still another technique which has been used in full-wave rectification and phase locking on the second harmonic, followed by frequency division. Such circuits have ambiguity problems and difficulties arise due to nonlinearities in the circuit. In another system, synchronization is achieved by means of a proportional correction of the position of a data strobe pulse. In this arrangement, a plurality of incremental pulses are added or subtracted, or both, for each data transition, in order to control the count of a counter relative to a data transition. Generation of the control signal which determines the addition or subtraction of pulses is obtained to produce the desired proportional correction characteristic. This technique, which is similar to the present application in that it involves proportional control, involves complicated timing techniques and is not particularly suitable for incorporation into relatively inexpensive modems. The present application eliminates the complexity and expensive components of the known prior art techniques by achieving high speed control using circuitry which is basically logical and, therefore, simple to fabricate using commercially available circuit elements. The resulting timing recovery circuit exhibits proportional control and, as a result, the greater the difference in timing, the greater the control signal produced. Because of this, the timing recovery circuit of the present application, produces synchronization between the local clock and the data signal very quickly.

SUMMARY OF THE INVENTION

The timing recovery circuit of the present invention, in its broadest aspect, comprises a variable frequency oscillator and detection means for providing an analog signal which undergoes polarity transitions. Sampling means which provide first and second samples of the analog signal are connected to the variable frequency oscillator and the detection means. The polarity and magnitude of a possible transition is determined by first means connected to the sampling means and second means also connected to the sampling means determines if a transition has in fact occurred. The outputs of the first and second means are connected to a gating circuit which provides an output when a transition has occurred. Finally, means for applying the resultant output are connected to the variable frequency oscillator to change the frequency thereof.

In accordance with more particular aspects of the invention, the detection means may be a detector circuit which provides an unequalized analog signal the positive and negative polarities of which, in given time intervals, are representative of digital data. The sampling means for providing first and second samples includes a first sampling gate for sampling the analog signal to obtain an output; the amplitude and polarity of which represent the departure of the analog signal from zero at the sampling interval and a second sampling gate for sampling the analog signal at the end of a given period to obtain the polarity of the analog signal. The first means for determining the direction of a possible transition includes means such as a gate for providing one of two possible outputs, one output being the inverse of the other, the resulting output being of the same polarity and magnitude as the first sample when the second sample is of one polarity and of the opposite polarity and same magnitude as the first sample when the second sample is of the opposite polarity. This gating arrangement prevents any ambiguity in driving the voltage controlled oscillator in the proper direction. The means for determining if a transition has occurred includes a delay device connected to the sampling means which provides the second samples and provides an output delayed by one bit time. Also included is an exclusive OR gate, the input terminals of which are connected to the input and the output of the delay device. The OR gate provides an output only when the polarities of the samples at the input and the output of the delay line are different. The means responsive to the first and second means for providing an output includes a gate, the control signal of which is derived from the second means and the output of which is derived from the first means. Finally, the output of the gate, which is operable only when the exclusive OR gate provides an output, is delivered to an averaging filter and applied to the control electrode of a voltage controlled oscillator to change its frequency in one direction or the other to bring its zero crossings into synchronism with the zero crossings of the input analog signal.

It is therefore, an object of this invention to provide a timing recovery circuit which is basically logical and amenable to fabrication utilizing commercially available circuit elements.

ANother object is to provide a timing recovery circuit which involves proportional control and quick response to achieve synchronism.

Still another object is to provide an inexpensive timing recovery circuit which can be easily adapted for use in low-cost data modems.

The foregoing and other objects, features and advantages of the invention will become apparent from the following more particular description of a preferred embodiment of the invention as illustrated in the accompanying drawings. Brief Description of the Drawings FIG. 1 is a block diagram of the timing recovery circuit of the present invention.

Figure 1A:
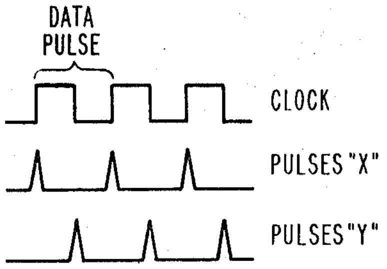

FIG. 1A is a representation of various timing pulses required in the operation of the system of FIG. 1.

Figure 2:
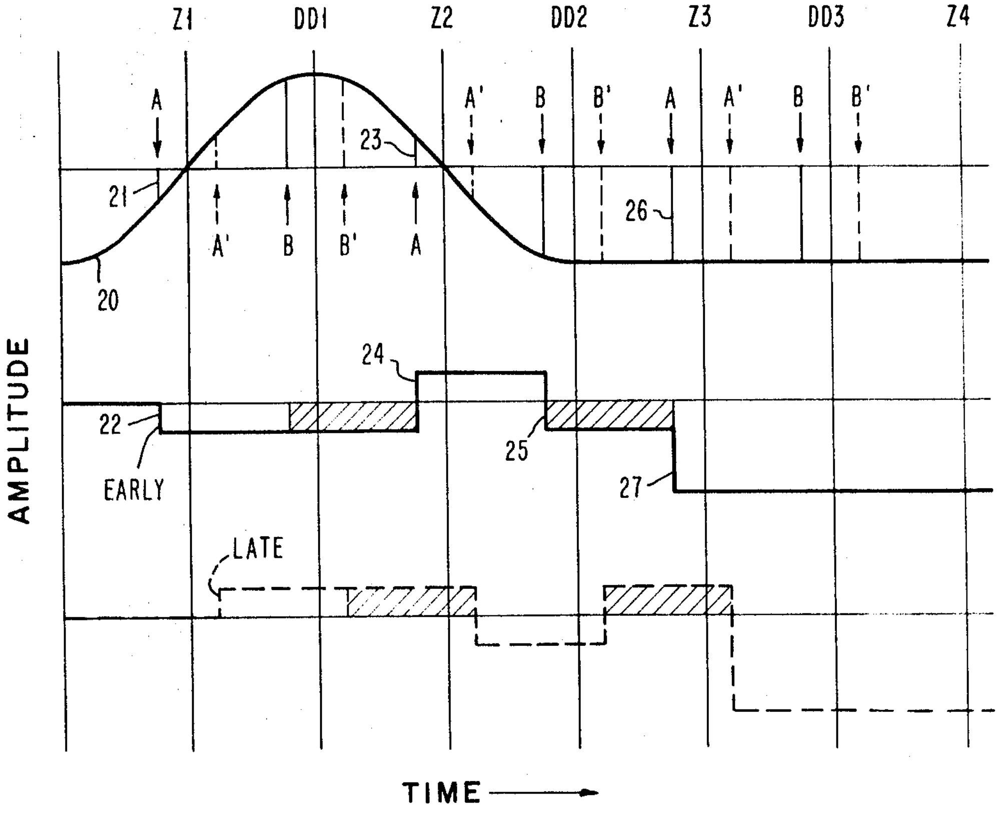

FIG. 2 shows a graphical representation of an analog waveform which experiences transitions from negative to positive and from positive to negative. Also shown are examples of early and late sampling of the analog signal and the values of voltage obtained under early and late conditions both when the analog signal experiences a negative-to-positive excursion through zero and when the analog wave length experiences a positive-to-negative excursion through zero. Also shown are graphs of amplitude versus time values of the voltage applied to a sample and hold circuit for both early and late conditions and, the voltage applied from an inverting gate as a function of the polarity of the analog signal during a second sampling or data decision interval.

Figure 3:
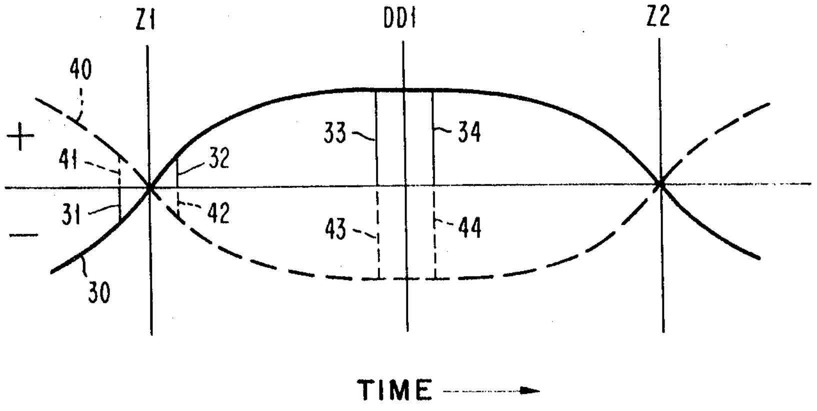

FIG. 3 shows a solid line analog waveform and a dotted line analog waveform of opposite polarity. These waveforms show that regardless of whether the timing is early or late, the data decision sample for a negative-to-positive transition is always positive and the data decision polarity for a positive-to-negative transition is always negative. By inverting all samples obtained during a first sampling interval when the polarity obtained during a second sampling interval is negative (indicating a positive-to-negative transition) whether the timing is early or late, the control voltages ultimately applied to the voltage controlled oscillator will always be in the proper direction to synchronize the voltage-controlled oscillator with the zero crossing of the input analog waveform.

Figure 4:
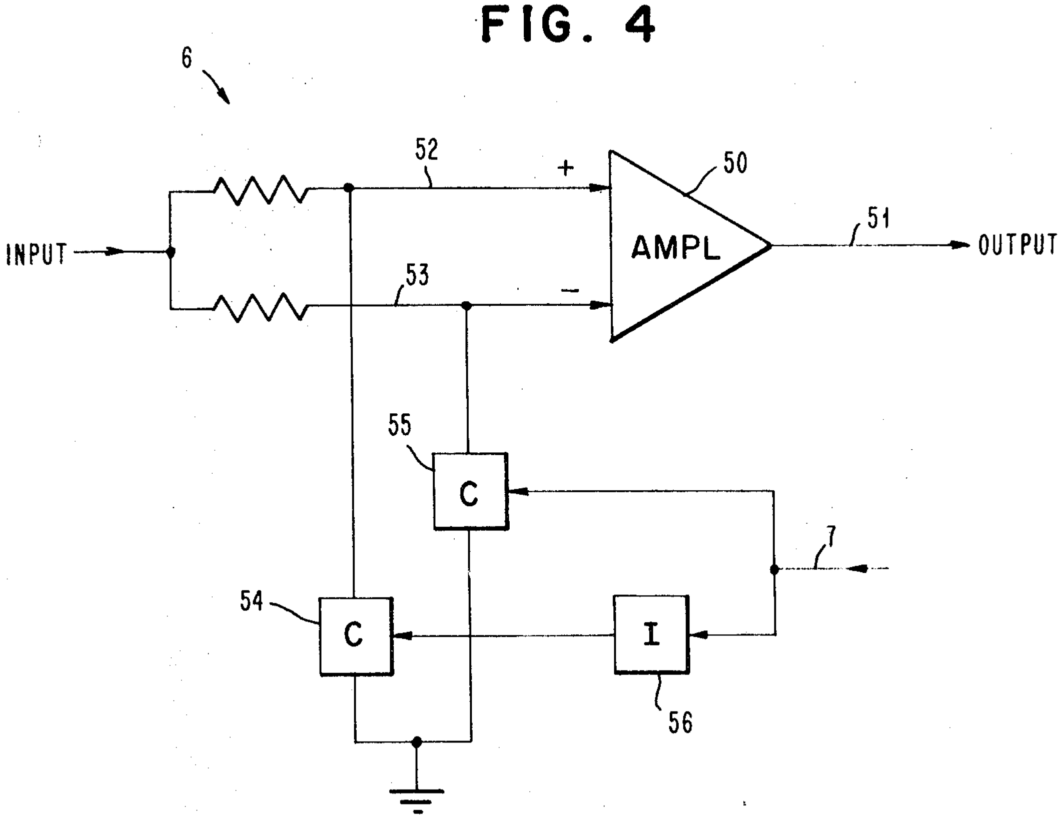

FIG. 4 shows a partial schematic-partial block diagram of an inverting gate which provides an output of one polarity when its control signal is of one polarity and an output of opposite polarity when its control signal is of the opposite polarity.

Figure 5:
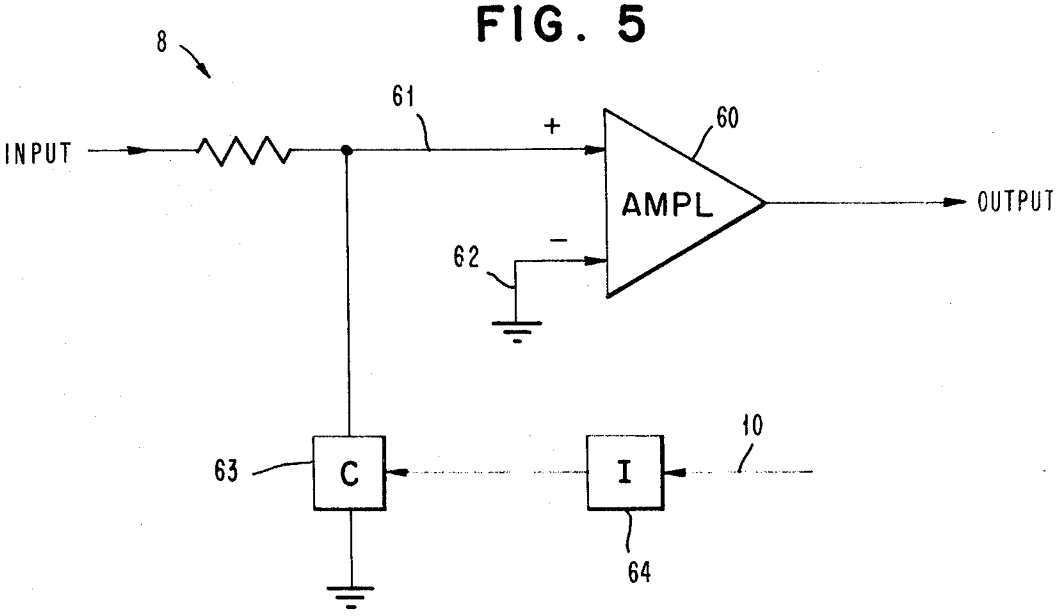

FIG. 5 shows a gate circuit utilized in applying the output of the inverting gate under control of an output from the exclusive OR circuit to an averaging filter. The output of this gate ultimately controls the frequency of the voltage-controlled oscillator. Description of the Preferred Embodiment Referring now to FIG. 1 and 1A, there is shown a block diagram of apparatus and timing waveforms utilized in the practice of the present invention. A voltage-controlled oscillator 1 shown in a block designated VCO provides pulses labeled as Pulses A and B in FIG. 1A on leads X and Y and a clock on lead Z which is labeled CLOCK in FIG. 1A. An analog input representative of digital data which experiences zero crossings derived from a source (not shown), which may be a data receiver or the like, is applied via conductor 2 to a sample and hold circuit 3 and, via conductor 4 to a second sampling means 5 which may be a clocked flip-flop, for example. Clocked flip-flops which are commercially available provide one of two possible outputs (a binary "1" if the input is $\geq 0$, and a binary "0" if the input is $<0$) when the analog signal is sampled by applying a Pulse Y shown in FIG. 1A from voltage control oscillator 1 via lead Y. Sample and hold circuit 3 is of a type which is commercially available and provides for the storing of the magnitude and polarity of the analog signal at the instant it is sampled by applying a Pulse X shown in FIG. 1A to it from voltage-controlled oscillator 1 via lead X. Voltage-controlled oscillator 1 may be any one of a number of commercially available voltage-controlled oscillators. Pulses X and Y and the Clock waveform shown in FIG. 1A may be derived from the output of a voltage-controlled oscillator by well-known wave-forming and differentiating circuits. For example, the Clock waveform of FIG. 1A may be derived from an amplified and clipped sinusoidal wave which is the output of the voltage-controlled oscillator. In turn, Pulse X is the positive going spike of the differentiated Clock waveform while Pulse Y is the inverted negative going spike of the differentiated Clock waveform. In connection with the waveforms of FIG. 1B, it should be noted that Pulse X occurs before Pulse Y and Pulse X defines a first sampling interval while Pulse Y defines a second sampling interval. In the usual case where the zero crossover of the input analog waveform coincides with the zero axis crossing of the sinusoidal output of voltage-controlled oscillator 1, the actuation of sample and hold circuit 3 by applying Pulse X to it via lead X would produce a zero voltage and the input analog waveform which is representative of digital data would be synchronous with voltage-controlled oscillator 1. When, however, sample and hold circuit 3 is actuated early or late with respect to the zero crossover of the input analog signal, voltages of different magnitude and polarity are held in sample and hold circuit 3 depending upon the departure of the sampling time from the time when the analog signal actually crosses through zero and on the direction, i.e., positive-to-negative or negative-to-positive, the transition takes. Further consideration of FIG. 1A shows that the time between successive Pulses X and Y is equal to one bit time and that Pulses Y occur a fraction (which may, for example, be one half as shown) of a bit time later than Pulses X. As a result, clocked flip-flop 5 is sampled one half bit time later than a sample and hold circuit 3, This is done to insure that the polarity of a data bit is obtained. Once the polarity of the data bit is obtained, a data decision (whether the data is a mark or space or a "1" or a "0") is made. The polarity of the data decision as represented by a binary "1" or "0" determines the polarity of the control voltage ultimately applied to voltage control oscillator 1. This will be discussed in more specific detail in what follows.

Once a sample of the analog input is obtained and held in sample and hold circuit 3, a voltage of the polarity and magnitude of the analog sample is applied to the input of an inverting gate 6 shown in FIG. 1. The output of inverting gate 6 is controlled by the polarity of the output of clocked flip-flop 5. Thus, if a positive polarity or a "1" is applied via conductor 7 to gate 6, the output of gate 6 is of the same polarity and magnitude as the sample applied from sample and hold circuit 3 to the input of inverting gate 6. On the other hand, if the output applied to inverting gate 6 via lead 7 is negative or a binary "0," the output of inverting gate 6 is of opposite polarity and of the same magnitude as the output of sample and hold circuit 3 which is applied to the input terminal of inverting gate 6. The use of inverting gate 6 permits voltage-controlled oscillator 1 to be driven in the proper direction without ambiguity regardless of the direction of the analog waveform transition or zero crossover.

Before proceeding with the description of the remainder of the timing recovery circuit of the present invention, the events just described may be recapitulated and clarified by a consideration of the graphical representations shown in FIG. 2. FIG. 2 is a graphical representation showing the variation in amplitude with time of an analog signal which experiences zero crossovers and is representative of digital data. First and second sampling intervals are shown for both early and late timing relative to the zero crossovers of the analog input and transitions of the analog waveform from negative-to-positive and positive-to-negative and a nonreturn-to-zero condition are also shown. In addition, the voltage of sample and hold circuit 3 is graphically represented and the output of inverting gate 6 which is dependent on the polarity of the data decision is also shown.

In FIG. 2, an analog waveform 20 representative of digital data is shown having zero axis crossovers at times Z1 and Z2. At times Z3 and Z4, no zero crossovers occur. Times Z1–Z4 are the times of zero crossover when analog wave 20 is in synchronism with the output of voltage-controlled oscillator 1. Times DD1, DD2 and DD3 are the data decision or sampling times which occur as a result of the application of Pulses Y on clocked flip-flop 5 of FIG. 1. Sampling times DD1–DD3 are exactly one-half bit time away from the zero crossover times Z1–Z4 in the selected regime. Solid timing arrows A and dotted timing arrows A′ show the early and late sampling of analog wave 20 by sample and hold circuit 3 when analog waveform 20 is out of synchronism with the output of voltage-controlled oscillator 1. Timing arrows B and B′ show the early and late occurrence of the data decision one-half bit time later relative to the occurrence of early and late timing arrows A and A′. Assuming for purposes of explanation that the leftmost solid timing arrow A represents the early sampling of analog waveform 20, a voltage of negative polarity and having a magnitude less than the maximum amplitude of analog waveform 20 and represented by line 21 in FIG. 2 is obtained and applied to sample and hold circuit 3. This value of voltage having a negative polarity is shown at 22 in FIG. 2 and is held at this value until analog waveform 20 is sampled one-half bit time later and at a time shown by the leftmost timing arrow B in FIG. 2. At this point, clocked flip-flop 5 determines that the polarity of the sample obtained is of positive polarity and that the output of inverting gate 6 is the same as the output of sample and hold circuit 3. The The shaded portion of graph 22 shows the output of inverting gate 6 which is applied to gate 8 in FIG. 1.

Considering now solid timing arrow A to the left of Z2, the amplitude and polarity of a sample of analog input signal 20 is shown at 23 in FIG. 2. When this sample is obtained by sample and hold circuit 3, the polarity and magnitude of the sample and hold circuit 3 is changed from the polarity and magnitude of value 22 to that shown at 24 in FIG. 2. This value is held for half a bit time until the instant shown by the solid B timing arrow to the left of DD2 in FIG. 2. At this point, clocked flip-flop 5 determines that the polarity is negative and a signal of negative polarity or a digital "0" is applied to inverting gate 6 causing gate 6 to provide at its output an inverted version of the information being held in sample and hold circuit 3. Value 25 having a polarity opposite to value 24 but of the same magnitude is applied to an input of gate 8 in FIG. 1. Considering now the solid timing arrow A to the left of Z3, a sample 26 of negative polarity is obtained. This value is held in sample and hold circuit 3 is shown as value 27 in FIG. 2. One-half bit time later, at an instant shown by solid bit timing arrow B, clocked flip-flop 5 samples analog waveform 20 and provides an output of negative polarity or a digital "0" which is applied via conductor 7 to inverting gate 6. An output is provided by gate 6 which, based upon the information received and the criteria involved, should be an inverted version of the information stored in sample and hold circuit 3. However, because no transition has occurred as determined by a circuit yet to be described, while such a signal is provided at the output of inverting gate 6 and transmitted to the input of gate 8, this signal is not passed to control the frequency of voltage-controlled oscillator 1. As such, the polarity and magnitude of the sample in sample and hold circuit 3 will be the same at the next sampling time when the value of this sample may or may not change depending on whether or not a transition occurs. From the foregoing, it may be seen that unless a transition is detected, no control signal is provided to adjust the frequency of voltage-controlled oscillator 1.

The lower portion of FIG. 2 shows in the unshaded portion of that graph the polarity and magnitude of the samples applied to sample and hold circuit 3 when both the timing intervals represented by dotted timing arrows A′ and B′ are late relative to the zero crossover of analog signal 20. The shaded portions show the polarity and magnitude of the control voltage ultimately applied to voltage-controlled oscillator 1 under the same conditions. These samples are obtained in the manner similar to that just described in connection with the early samples and the circuits involved operate in exactly the same manner.

Returning now to FIG. 1 and continuing with the description of the timing recovery circuit of the present invention, an output signal from inverting gate 6 is applied to an input of gate 8. The signal applied to an input of gate 8 has a polarity either the same or opposite to the signal appearing at the output of sample and hold circuit 3 depending upon the polarity of the signal applied via lead 7 to inverting gate 6. The signal applied at the input of gate 8 passes to an averaging filter 9 under control of a control signal on a lead 10 which is supplied from a circuit arrangement which determines whether or not a transition or zero crossover of analog input 20 has in fact occurred. This determination is made by comparing the polarity of a present sample with the polarity of the preceding sample and by providing an output only when a comparison of the samples shows them to be different.

In FIG. 1, this is accomplished by applying the output of clocked flip-flop 5 via line 11 to the input of a one-bit delay shift register or a one-bit delay line 12 and to one terminal of an exclusive OR circuit 13. The output of delay means 12 is applied to the other input of exclusive OR circuit 13. In this manner, a comparison made in exclusive OR circuit 13 between the polarity of the present signal as represented by a binary "1" or "0" from the output of clocked flip-flop 5 and the polarity of the preceding bit which is similarly represented by either a binary "1" or "0" from clocked flip-flop 5.

Exclusive OR circuit operates in accordance with the following truth table:

$0 \oplus 0=0$
$0 \oplus 1=1$
$1 \oplus 0=1$
$1 \oplus 1=0$

From the foregoing, it may be seen that only where the inputs to exclusive OR circuit 13 are different is an output equal to a binary "1" provided.

It should be recalled at this point that an input signal from inverting gate 6 is present at the input of gate 8 which is to be passed or not passed depending upon whether or not a transition has occurred. The output signal of exclusive OR circuit 13 is provided on lead 10 of gate 8 via an AND gate 14 which is actuated only after the occurrence of Pulses Y at the data decision time. This is accomplished by applying the Clock via lead Z to an inverter 15 which provides a binary "1" at its output only during the time after the occurrence of the data decision. AND gate 14 is thus enabled and if the output of exclusive OR circuit 13 is "1," this signal is passed enabling gate 8 and passing the signal on its input to an averaging filter 9 which in turn applies the averaged control signal to voltage-controlled oscillator 1.

From this it may be seen that either positive or negative voltages are applied to voltage-controlled oscillator 1 which are a function of their departure from the zero axis crossing and in an unambiguous manner. Thus, it does not matter whether the actual timing is early or late with respect to the zero axis crossing. The circuit of the present invention overcomes any possible ambiguity which might result from the fact that the output of sample and hold circuit 3 can be of either polarity depending upon the direction of a transition through the zero axis. This should be apparent from the consideration of FIG. 3 wherein two analog waveforms representative of digital data are shown experiencing zero crossovers in different directions. Thus, solid waveform 30 experiences a zero crossover at Z1 going from a negative to a positive polarity. On the other hand, dotted analog waveform 40 experiences a zero crossover at Z1 going from a positive polarity to a negative polarity. Note that the early samples 31 and 41 are of opposite polarity depending upon the direction of zero crossing of analog waveforms 30 and 40. Also note that the late samples 32, 42 can be of opposite polarity depending upon the direction of crossover of analog waveforms 30 and 40. It was noted that if the direction of transition through Z1 was from negative to positive that the data decision or sample obtained by clocked flip-flop 5 was always of positive polarity regardless of whether the sample stored in sample and hold circuit 3 is positive or negative. Thus, early sample 31 and late sample 32 for analog wave 30 going through zero in a negative to positive direction always provides a positive signal or a binary "1" at the output of clocked flip-flop 5 as represented by samples 33 and 34 in FIG. 3. Where an analog wave such as wave 40 passes through zero in a positive to negative direction, providing early and late samples 41, 42, respectively, the output of clocked flip-flop circuit 5 is always of negative polarity or a binary "0" regardless of whether the sampling is early or late. The data decision samples of a positive to negative going analog waveform 40 are shown at 43 and 44 in FIG. 3.

From the foregoing, it can be seen that an unambiguous determination can be made of the polarity of the signal to be applied to voltage controlled oscillator 1. Thus, where the sample applied to sample and hold circuit 3 is of positive polarity and give magnitude, and where the data decision represented by timing arrows 43 or 44 is of negative polarity, the output of the sample and hold circuit is inverted in gate 6 and the inverted signal applied to the voltage-controlled oscillator 1. Note that the negative going signal 31 applied to sample and hold circuit 3 is not inverted because data decision sample 33 is of positive polarity and, as a result, the output of circuit 3 is ultimately applied to change the frequency of voltage-controlled oscillator 1. Thus, both early and late samples of negative-to-positive transition provide a positive polarity at a data decision time while both early and late samples of a positive-to-negative transition provide a negative transition at a data decision time. By simply inverting one of the early and one of the late signals, a simple polarity output drives the oscillator in one direction while another polarity signal drives it in the other direction.

FIG. 4 shows an embodiment of an inverting gate which may be used as inverting gate 6 in the circuit of FIG. 1. A differential amplifier shown schematically at 50 in FIG. 4 provides an output based upon the difference between the potentials on input terminals 52 and 53. The output of sample and hold circuit 3 is applied to the input terminals 52, 53 of differential amplifier 50. Each of the input terminals may be clamped to ground via clamps 54 and 55. Clamps 54 and 55 are controlled by the potential appearing on lead 7 which provides from the output of clocked flip-flop 5 a binary "or "0"0. " An inverter 56 provides an output opposite to its input to clamp 54. Thus, if a binary "1" is applied to input 7, clamp 55 is operated, shortening terminal 53 to ground while clamp 54 remains inoperative due to the "0" value at its input and, amplifier 50 provides at output 51 a voltage of the same polarity and magnitude which was stored in sample and hold circuit 3. If, however, a binary "0" is applied to lead 7, clamp 55 remains inoperative while clamp 54 is operated shorting terminal 52 to ground. As a result, amplifier 50 provides at output 51 an inverted version of the output of sample and hold circuit 3.

FIG. 5 shows an embodiment of a gate circuit which may be utilized as gate 8 in the timing recovery circuit of FIG. 1. A amplifier 60 has two input terminals 61 and 62. The latter is grounded while the former is connected to the output of inverting gate 6. Input terminal 61 is connected to ground via clamp 63 which is operative upon the application of a binary 1 to its input terminal. An inverter 64 inverts the control signal from AND gate 14 which is applied to gate 8 via conductor 10. A binary "1" on conductor 10 is inverted and appears as a "0" on the input terminal of clamp 63 permitting a signal on the input to pass through the output of differential amplifier 60. If, however, a "0" appears on conductor 10, it is inverted to appear as a "1" at the input of clamp 63 thereby shorting terminal 61 of amplifier 60 to ground resulting in a "0" output at the output terminal of differential amplifier 60. Clamp circuits mentioned in FIGS. 4 and 5 may consist of field effect transistors which are operative to pass current when a voltage of proper polarity is applied to their gate electrodes.

Averaging filter 9 is a well known RC circuit which averages the output of gate 8 as well as effects due to jitter in the system.

In connection with the analog waveforms shown in certain of the FIGS., it should be appreciated that these waveforms are somewhat idealized for purposes of explanation. However, it should be also appreciated that the timing recovery circuit operation is substantially as shown provided the analog input wave exhibits zero crossings or transitions and provided the polarity of the analog waveform can be determined when a data decision is made.

In the above specification, a timing recovery circuit has been described which is particularly applicable to inexpensive data modems. Apart from the fact that it is inexpensive and simple to fabricate, synchronism is obtained rather swiftly when compared with other known schemes.

While the invention has been particularly shown and described with reference to a preferred embodiment, it will be understood by those skilled in the art that various changes in form and details may be made therein without departing from the spirit and scope of the invention.

What I claim is:

1. A timing recovery circuit comprising in combination,
a variable frequency oscillator,
detection means for providing an analog signal which undergoes polarity transitions,
sampling means for providing first and second samples of said analog signal connected to said variable frequency oscillator and said detector means,
first means connected to said sampling means for determining the direction of a possible transition,
second means connected to said sampling means for determining if a transition has occurred,
means responsive to said first and second means for providing an output when a transition has occurred, and
means for applying said output to said variable frequency oscillator to change the frequency thereof.

2. A timing recovery circuit according to claim 1 wherein said variable frequency oscillator is a voltage-controlled oscillator.

3. A timing recovery circuit according to claim 1 wherein said sampling means includes a first sampling gate for obtaining said first sample at a given time interval and a second sampling gate for obtaining said second sample at a later time interval.

4. A timing recovery circuit according to claim 1 wherein said first means for determining the direction of a possible transition includes gating means for providing one of two possible outputs, one output being the inverse of the other, said output being the same polarity and magnitude as said first sample when said second sample is of one polarity and of the opposite polarity and same magnitude as said first sample when said second sample is of opposite polarity.

5. A timing recovery circuit according to claim 1 wherein said second means for determining if a transition has occurred includes:
a delay device connected to said sampling means for applying said second samples thereto to provide an output delayed by a desired amount, and
an exclusive OR gate, the input terminals of which are connected to the input and output of said delay device, said OR gate providing an output only when the polarities of signals at the input and output of said delay device are different.

6. A timing recovery circuit according to claim 1 wherein said means responsive to said first and second means for providing an output includes a gate the control signal of which is derived from said second means and the output of which is derived from said first means.

7. A timing recovery circuit according to claim 1 wherein said means for applying an output includes an averaging filter connected to said means responsive to said first and second means.

8. A timing recovery circuit according to claim 4 further including means connected to said sampling means and said gating means for storing the polarity and magnitude of said first sample.

9. A timing recovery circuit according to claim 5 wherein said delay device is a shift register providing a delay equal to one bit time.

10. A timing recovery circuit according to claim 5 wherein said delay device is a delay line providing a delay equal to one bit time.

11. A timing recovery circuit according to claim 7 wherein said means for averaging includes an RC integrator.

12. A timing recovery circuit comprising:
a voltage-controlled oscillator,
means for developing unequalized analog signal the positive and negative polarities of which in given time intervals are representative of digital data,
first means for sampling said analog signal to obtain an output the amplitude and polarity of which represents the departure of said analog signal from zero at the sampling interval,
means for storing said amplitude and polarity of said output of said first means for a given period after sampling, second means for sampling said analog signal at the end of said given period to obtain the polarity of said analog signal, means responsive to the polarity of said second sampling means for providing an output signal of the same amplitude and polarity as that held in said means for storing when said output of said second means is of one polarity and an output signal of the same amplitude but of opposite polarity as that held in said means for storing when said output of said second means is of another polarity, means for comparing the polarities of said analog signal at the end of said given time period with the polarity of a different analog signal at the end of a previous given time period to provide an output only when said polarities are different, and means responsive to said last-mentioned output for applying said output of said means responsive to the polarity of said second sampling means to control the frequency of said voltage-controlled oscillator.

13. A timing recovery circuit according to claim 12 wherein said means responsive to the polarity of said sampling means includes an inverting gate, the input of which is connected to said means for storing and the control electrode of which is connected to said second sampling means.

14. A timing recovery circuit according to claim 12 wherein said means for comparing includes a delay device connected to said second sampling means to provide an output delayed by one bit time, and an exclusive OR gate, the input terminals of which are connected to the input and output of said delay device, said gate providing an output only when the polarities of signals at the input and output of said delay device are different.